United States Patent [19]
Kobylack

[11] Patent Number: 5,320,263
[45] Date of Patent: Jun. 14, 1994

[54] GOLF CART BEVERAGE SUPPORT

[76] Inventor: Richard L. Kobylack, 29 Lincoln Dr., Poughkeepsie, N.Y. 12601

[21] Appl. No.: 44,805

[22] Filed: Apr. 12, 1993

[51] Int. Cl.⁵ .................................................. B60R 9/00
[52] U.S. Cl. .................................... 224/274; 224/282; 224/42.45 R; 224/42.46 R; 206/217; 206/817; 248/311.2
[58] Field of Search ............... 224/273, 274, 276, 277, 224/282, 42.45 R, 42.46 R, 42.42, 42.41, 918, 148; 206/217, 315.3, 806, 817, 564; 220/738, 751, 504, 505, 501, 412, 411; 248/311.2, 312, 312.1, 313

[56] References Cited

U.S. PATENT DOCUMENTS

| | | | |
|---|---|---|---|
| 3,070,105 | 12/1962 | Brown | 220/504 X |
| 3,313,508 | 4/1967 | Mancl | 224/374 X |
| 3,423,571 | 1/1969 | Trachterberg et al. | 224/282 X |
| 3,844,459 | 10/1974 | Chambers | 224/274 |
| 4,535,923 | 8/1985 | Mane | 224/273 |
| 4,596,370 | 6/1986 | Adkins | 248/311.2 |
| 4,606,523 | 8/1986 | Statz et al. | 248/311.2 |
| 5,143,335 | 9/1992 | Frankel | 248/311.2 X |
| 5,249,770 | 10/1993 | Louthan | 248/311.2 |

Primary Examiner—Glenn T. Barrett
Attorney, Agent, or Firm—E. Michael Combs

[57] ABSTRACT

A support tube is arranged for securement about a golf cart handle, with the support tube arranged for pivotally mounting a support flange structure that is arranged to include a floor and surrounding band member to receive and position a beverage container therewithin.

3 Claims, 5 Drawing Sheets

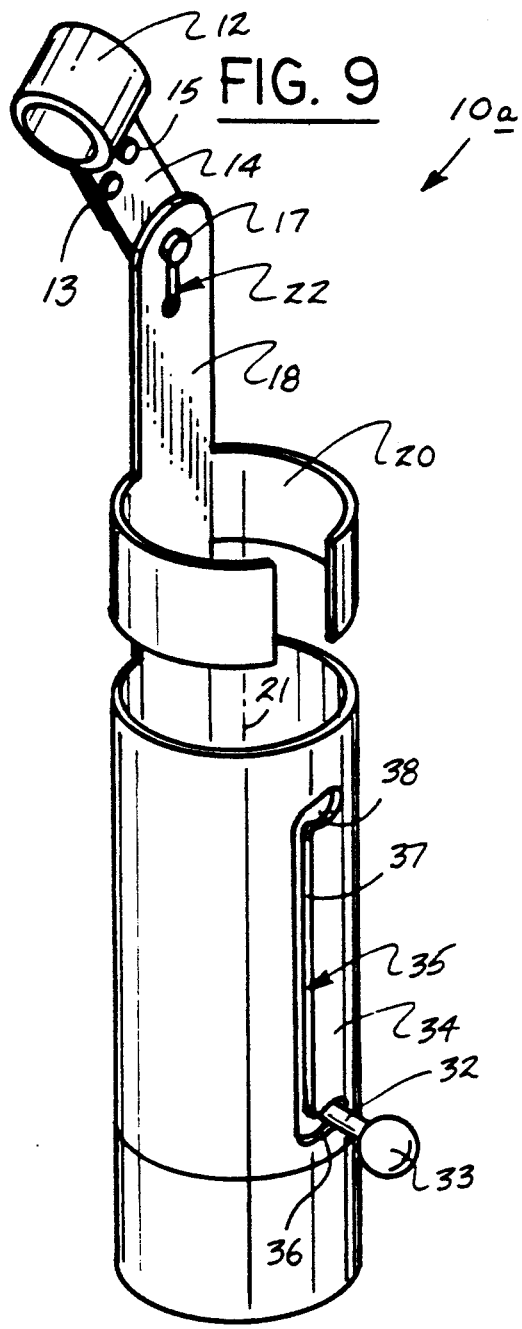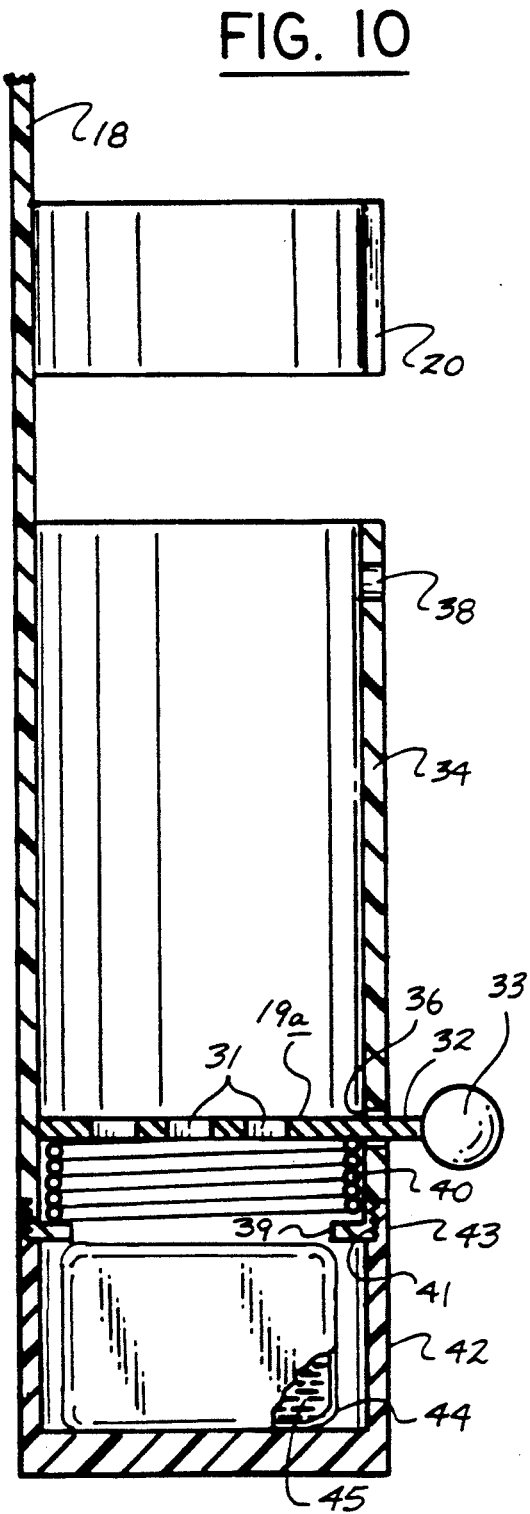

GOLF CART BEVERAGE SUPPORT

BACKGROUND OF THE INVENTION

1. Field of the Invention

The field of invention relates to beverage container structure, and more particularly pertains to a new and improved golf cart beverage support wherein the same is arranged for mounting an associated golf cart member for ease of transport and support of an associated beverage container therewithin.

2. Description of the Prior Art

Golf cart accessory structure of various types have been utilized throughout the prior art, wherein U.S. Pat. No. 4,970,760 to Hewkins indicates the use of a clamping arrangement relative to a golf cart for means of assembly and securement of accessory structure relative to a golf cart.

U.S. Pat. No. 4,889,267 indicates the use of a beverage container cooler mounted to a golf cart, and wherein U.S. Pat. No. 3,734,439 to Wintz indicates a golf cart member having a pivotally mounted receptacle for receiving a beverage container thereon.

The instant invention attempts to overcome deficiencies of the prior art by providing for a golf cart member arranged for ease of assembly and disassembly relative to a golf cart for securing a beverage container thereon and in this respect, the present invention substantially fulfills this need.

SUMMARY OF THE INVENTION

In view of the foregoing disadvantages inherent in the known types of golf cart beverage support structure now present in the prior art, the present invention provides a golf cart beverage support wherein the same is arranged to pivotally mount in a movable orientation, a golf support container relative to an associated golf cart handle. As such, the general purpose of the present invention, which will be described subsequently in greater detail, is to provide a new and improved golf cart beverage support which has all the advantages of the prior art golf cart beverage support structure and none of the disadvantages.

To attain this, the present invention provides a support tube arranged for securement about a golf cart handle, with the support tube arranged for pivotally mounting a support flange structure that is arranged to include a floor and surrounding band member to receive and position a beverage container therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved golf cart beverage support which has all the advantages of the prior art golf cart beverage support structure and none of the disadvantages.

It is another object of the present invention to provide a new and improved golf cart beverage support which may be easily and efficiently manufactured and marketed.

It is a further object of the present invention to provide a new and improved golf cart beverage support which is of a durable and reliable construction.

An even further object of the present invention is to provide a new and improved golf cart beverage support which is susceptible of a low cost of manufacture with regard to both materials and labor, and which accordingly is then susceptible of low prices of sale to the consuming public, thereby making such golf cart beverage supports economically available to the buying public.

Still yet another object of the present invention is to provide a new and improved golf cart beverage support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an isometric illustration of a modified aspect of the invention.

FIG. 10 is an orthographic partial cross-sectional illustration of the invention as indicated in FIG. 9.

DESCRIPTION OF THE PREFERRED EMBODIMENT

Figure 1:
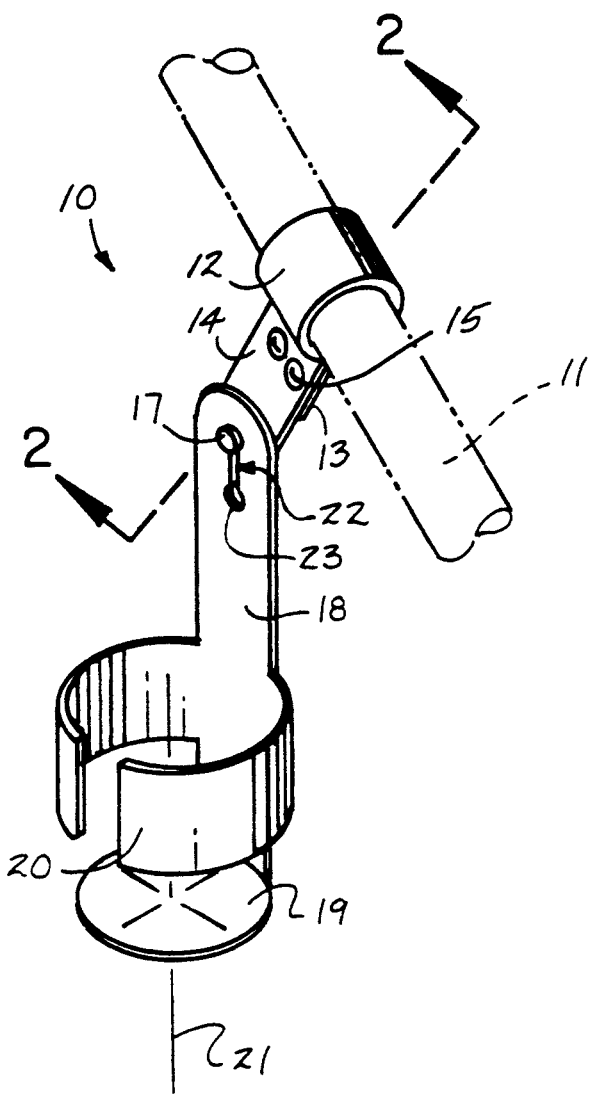
FIG. 1 is an isometric illustration of the invention.

With reference now to the drawings, and in particular to FIGS. 1 to 10 thereof, a new and improved golf cart beverage support embodying the principles and concepts of the present invention and generally designated by the reference numerals 10 and 10a will be described.

Figure 2:
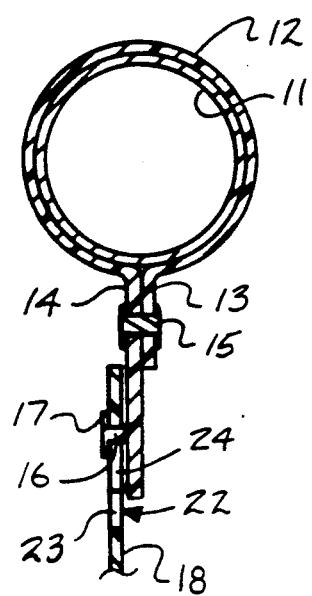
FIG. 2 is an orthographic view, taken along the lines 2—2 of FIG. 1 in the direction indicated by the arrows.

More specifically, the golf cart beverage support 10 of the instant invention essentially comprises mounting to a golf cart handle 11, wherein the apparatus comprises a support tube 12 that includes a first flange 13 and a second flange 14 arranged in a facing relationship relative to one another, wherein the first and second flanges 13 and 14 project exteriorly of and in a radially aligned relationship relative to the support tube 12, including fasteners 15 to secure the first and second flanges 13 and 14 together, as indicated in FIGS. 1 and 2 for example. A support post 16 is fixedly and orthogonally mounted to the second flange 14, wherein the support post 16 includes a support post head 17 having a predetermined diameter. A support flange 18 is provided, the support flange 18 including a support flange floor 19 fixedly mounted at a lowermost end of the support flange 18, with the support flange floor 19 orthogonally oriented relative to the support flange 18, with the floor 19 symmetrically oriented about a predetermined axis 21, with a discontinuous annular band 20 mounted fixedly to the support flange 18 in a spaced relationship relative to the support flange floor 19, also symmetrically oriented about the axis 21. A keyhole opening 22 is directed through the support flange spaced from the annular band 20 and adjacent an uppermost distal end of the support flange 19. The keyhole opening 22 includes a receiving aperture 23 having a diameter substantially at least equal to said predetermined diameter to receive the support post heads 17 therethrough, wherein a receiving slot 24 oriented parallel relative to the axis 21 is in communication with and extends from the keyhole opening 22 to the support flange 18 uppermost distal end.

Figure 3:
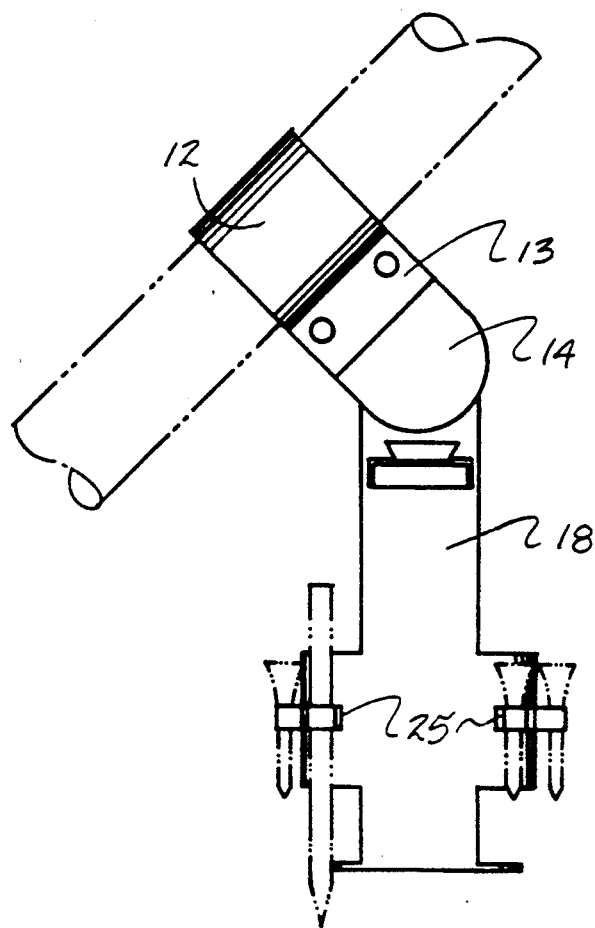
FIG. 3 is an orthographic rear view of the invention.

The FIG. 3 indicates the use of a plurality of support loops 25 mounted to the annular band 20 to accommodate various golf accessories such as golf tees, a pencil, and the like.

Figure 4:
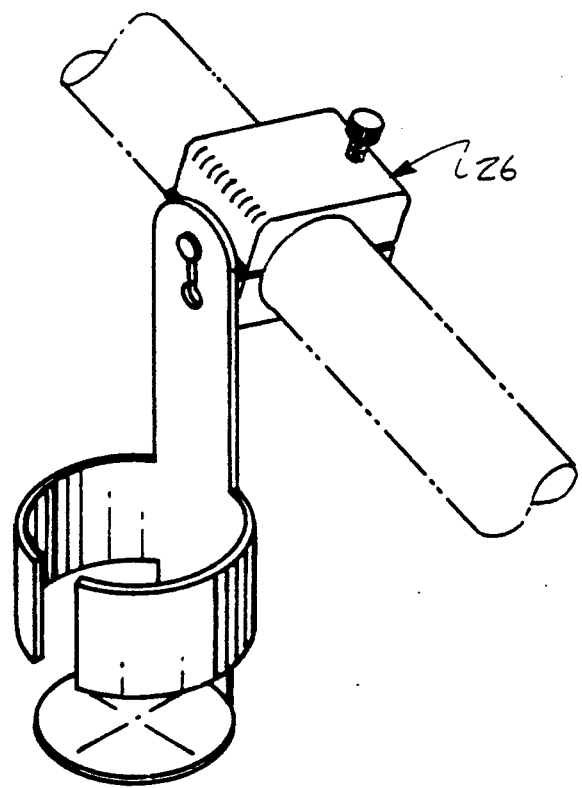
FIG. 4 is an isometric illustration of a modified mounting block structure.
Figure 5:
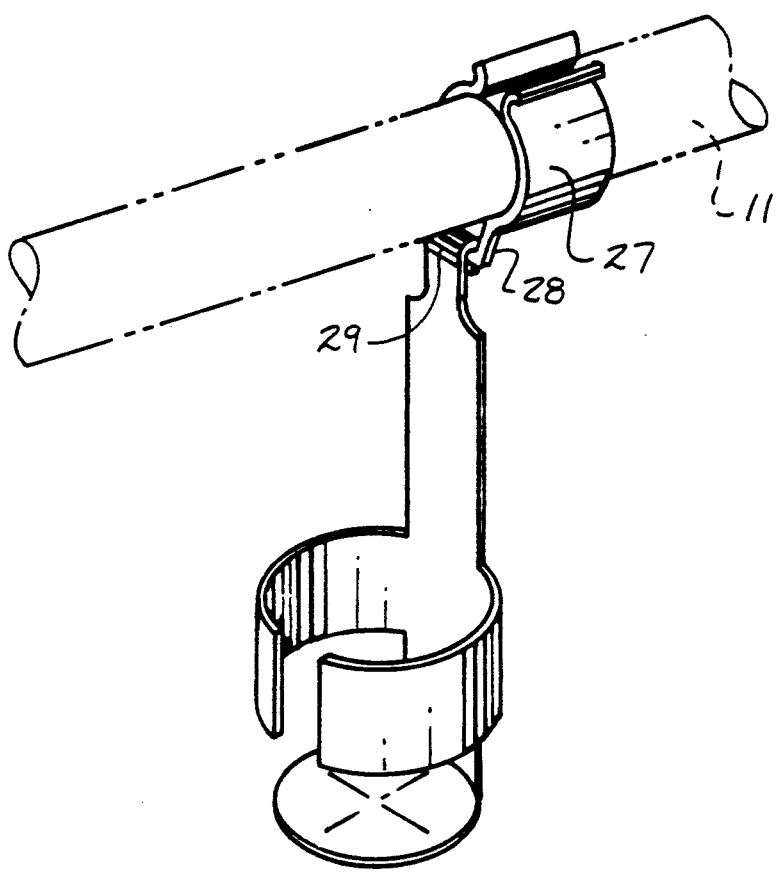
FIG. 5 is an isometric illustration of a further mounting clamp structure relative to the golf cart handle.
Figure 6:
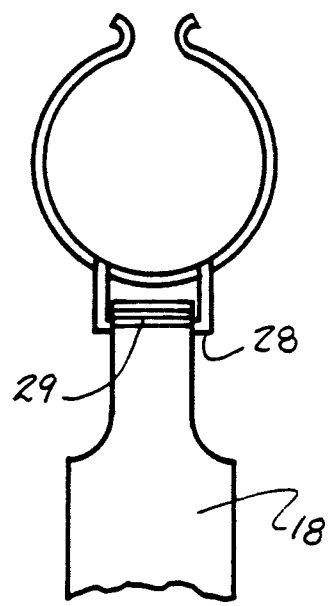
FIG. 6 is an orthographic view of the clamp structure of FIG. 5.

FIG. 4 is arranged to indicate the use of a separable block mount 26 to support the support flange structure, and the FIGS. 5 and 6 indicate the use of a split ring clamp 27 arranged for securement to the handle 11, wherein the split ring 27 includes a support leg 28 arranged to pivotally mount a flange loop 29 mounted to the uppermost distal end of the support flange 18.

Figure 7:
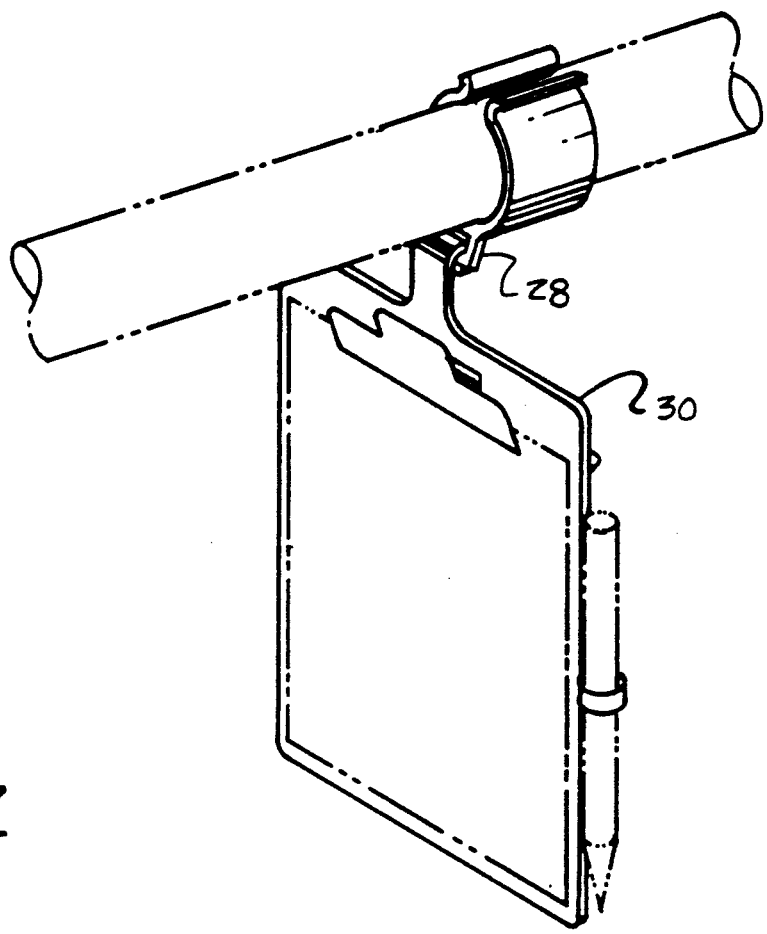
FIG. 7 is an isometric illustration of the clamp structure arranged for supporting a clip board member.
Figure 8:
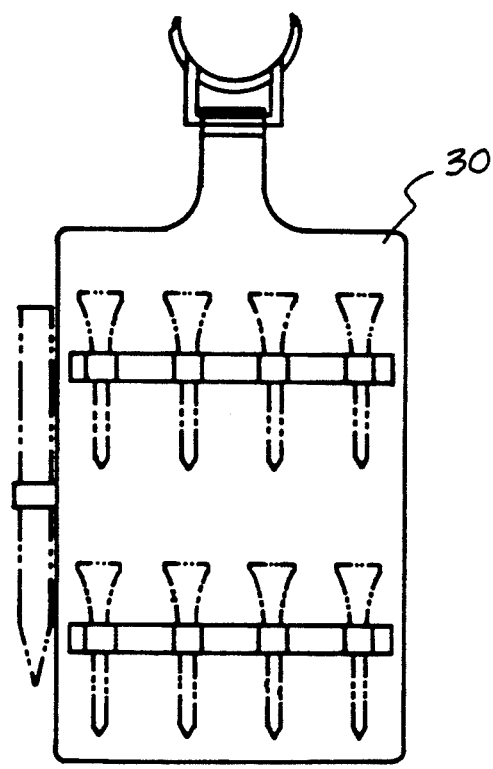
FIG. 8 is an orthographic view of the clip board member.

FIGS. 7 and 8 indicate the use of a clip board structure 30 that may be arranged for mounting to a comparable support leg structure 28, with the clip board arranged to provide for a plurality of loop members mounting various accessory components such as golf tees and pencil, as indicated in FIG. 8 for example.

FIG. 9 indicates the use of a modified beverage support 10a. The structure is arranged to further include a modified floor 19a positioned within a support tube 34 that is coaxially aligned along the axis 21 positioned from the annular band 20 extending to the support flange lowermost distal end, wherein the lowermost end portion of the support tube 34 includes an externally threaded lowermost end portion 41 arranged to threadedly receive the internally threaded skirt 43 of a refrigerant cup 42, that includes a refrigerant housing 44 therewithin, having a refrigerant gel 45 within the housing 44. The lowermost end portion of the support tube further includes an annular flange 39 arranged below the modified floor 19a to capture a spring 40 between the floor 19a and the annular flange 39. The modified floor 19a as indicated is arranged to include a plurality of apertures 31 directed therethrough to permit communication of chilled air within the housing 44 to be received within the support tube 34 through the apertures 31 to maintain chilling of a beverage within the support tube 34. Further, the modified floor 19a includes a floor handle shaft 32 extending through the side wall of the support tube 34 to a handle 33. The support tube 34 includes a U-shaped slot 35 directed through the side wall, wherein the U-shaped slot 35 includes a slot first leg 36 spaced from, parallel to, and coextensive with a slot third leg 38. An interconnecting slot second leg 37 orthogonally communicates with the first and second legs 36 and 38 to permit selective positioning of a cup member on the floor 19a and subsequently permit raising of the cup member by use of the biasing spring 40 to project the cup member in a raised orientation for ease of access during consumption to the third leg 38, whereupon to maintain cooling of the container (not shown) within the support tube 34, the handle shaft 32 is once again directed from the slot first leg 36 along the slot second leg 37 to the slot third leg 38.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf cart beverage support arranged for mounting to a golf cart handle, wherein the support comprises,
 a support tube, the support tube including a first flange and a second flange fixedly mounted to the support tube extending exteriorly of the support tube radially oriented relative to the support tube, wherein the second flange includes a support post, the support post including a support head, and a support flange, the support flange including a support flange first end and a support flange second end, with a support floor mounted relative to the support flange in adjacency to the first end, and a discontinuous annular band mounted to the support flange between the floor and the support flange second end, and a keyhole opening directed through the support flange between the annular band and the support post second end, wherein the keyhole opening includes a receiving aperture arranged to receive the support post head therethrough, and a receiving slot extending from the receiving aperture in communication with the receiving aperture, wherein the annular band and the floor are symmetrically oriented about a predetermined axis, and the receiving slot is arranged parallel and spaced from the axis, and a support cylinder is mounted to the support flange spaced from the annular band and extending from an orientation spaced from the annular band to the support flange first end, and the floor includes a plurality of apertures directed therethrough, and the floor includes a handle shaft mounted to the floor extending through the support cylinder, with the handle shaft having a handle positioned exteriorly of the support cylinder, and a U-shaped slot directed through the support cylinder, with the handle shaft extending through the U-shaped slot, the slot includes a slot first leg spaced from and parallel a slot third leg in a coextensive relationship, with a slot second leg extending orthogonally between and in communication with the slot first leg and the slot second leg, wherein the slot second leg is oriented parallel relative to the axis, and wherein the handle shaft is arranged for sliding reception through the slot first leg, the slot second leg, and the slot third leg.

2. A beverage support as set forth in claim 1 including a refrigerant cup, including an internally threaded skirt arranged for securement to the support cylinder adjacent the support flange first end, and wherein the refrigerant cup includes a refrigerant housing therewithin, and the refrigerant housing includes a refrigerant gel contained within the refrigerant housing, wherein the floor includes a plurality of floor apertures receiving cooling of ambient air through the apertures into the support cylinder.

3. A beverage support as set forth in claim 2 including an annular flange orthogonally and fixedly secured to the support cylinder extending into the support cylinder between the floor and the refrigerant cup, with a spring captured between the annular flange and the floor for biasing the floor.

* * * * *